Feb. 9, 1943.  R. H. DEYSHER  2,310,354
THERMO-ELECTRIC CELL
Filed April 2, 1940
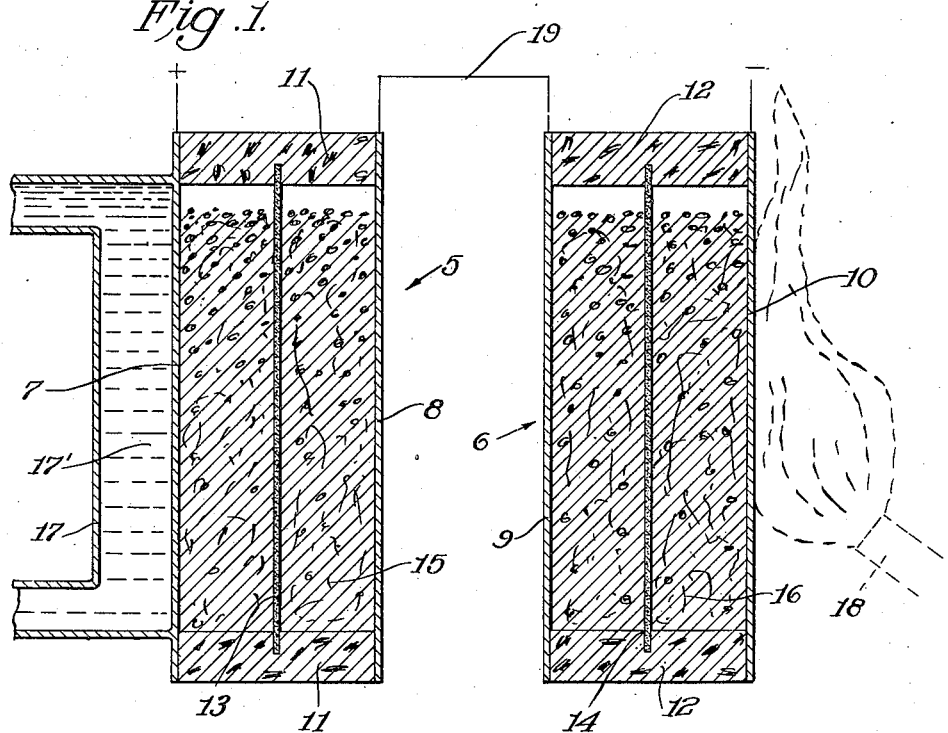
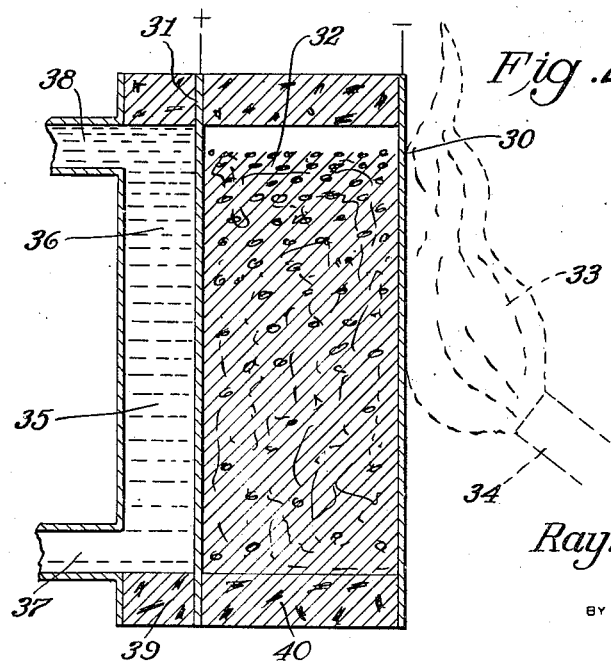
Raymond H. Deysher
INVENTOR
BY Victor J. Evans & Co.
ATTORNEYS Patented Feb. 9, 1943

2,310,354

UNITED STATES PATENT OFFICE 2,310,354

THERMOELECTRIC CELL

Raymond H. Deysher, Fleetwood, Pa.

Application April 2, 1940, Serial No. 327,504

2 Claims. (Cl. 136—83)

This invention relates to electric cells and has for an object to provide a cell which functions because of differences in concentration of electrolyte at the electrodes.

This case is a continuation in part of the abandoned Deysher application filed December 3, 1938, Serial No. 243,891, entitled "Thermoelectric cell."

An object of this invention is to provide cells having a relatively long useful life and which are operable satisfactorily at temperatures of the order of about one hundred degrees centigrade as contrasted to other similar types of cells which operate satisfactorily only at much higher temperatures.

An advantage characteristic of the preferred embodiment of this invention is that the cell is separable into a pair of units the differential heating of which in large installations is more easily accomplished than is the case when different portions of a single unit must be differentially heated as in existing types of cells.

A feature of the cells according to this invention is the use, as an electrolyte therein, of equilibrium mixtures of dissolved and undissolved salts whereby saturated electrolyte solutions are obtained irrespective of changes in thermal content of the cells.

Other objects, advantages and features of the novel electric cell according to the present invention will be apparent to those skilled in this art during the course of the following description.

Regarded in certain of its broader aspects, the novel electric cell according to the present invention comprises an electrolyte which comprises an equilibrium mixture of a polar salt and a solution thereof, and electrodes of similar substance in said electrolyte, one of the electrodes and surrounding electrolyte being at a different temperature from that of another electrode and its surrounding electrolyte. While in the preferred embodiment of this invention the differentially heated portions of the electrolyte are physically isolated though electrically connected, an alternative embodiment comprises a cell wherein the electrolyte in its entirety is within a single cell.

Referring now to the drawing,

Figure 1 is substantially a vertical sectional view of the presently preferred embodiment of this invention, and Fig. 2 is substantially a vertical sectional view of an alternative or second embodiment of this invention.

Referring now particularly to Fig. 1 of the drawing wherein the preferred embodiment of this invention is illustrated, it will be seen that the electric cell therein illustrated comprises a pair of inter-related units generally designated by the reference characters 5 and 6. Each of the units comprises confronting spaced electrodes which form sides of a container, namely the plates 7, 8, 9 and 10, which, together with other sides, complete the container enclosure, the tops and bottoms of the cell units being sealed by appropriate closures 11 and 12. Diaphragm plates 13 and 14 comprising semi-porous graphite prepared as hereinafter described carrying an electro-deposited metallic coating are rigidly mounted between the plates of each unit in a manner subdividing the interior thereof essentially as shown. Each of the cell units is filled with electrolyte as designated by the reference characters 15 and 16, the electrolyte comprising an equilibrium mixture of dissolved and undissolved polar salt of the metals from which the electrodes are formed. While considerable latitude in selecting an electrolyte for use with particular electrodes is permissible within the scope of this invention, it should be observed that in each instance the electrolyte surrounding the electrode should be a polar salt of the electrode metal. For instance, if in the above described cell the electrodes 7 and 10 are of identical substance the electrolyte wetting these electrodes should be a salt of the same substance having the mentioned characteristics, and the same should be true of the electrolyte wetting electrodes 8 and 9 which should be of identical substance, though not necessarily the same substance such as zinc salt as electrodes 7 and 10. When the electrolytes are different zinc salt is used on one side of the diaphragm and salt of iron on the other.

Experience indicates that in selecting an appropriate electrolyte for use in the cell above described a polar salt of the metal used as the electrode should be selected which shows marked difference in solubility at different temperatures. It has been found that if zinc plates are used as electrodes, zinc sulphate and zinc chloride are useful as electrolytes and in like manner copper sulphate or copper chloride can be used if copper electrodes are employed.

A cooling jacket 17 within which is circulated a cooling medium 17' is mounted adjacent the cell generally designated by the reference character 5 and appropriate heating means such as a burner 18 is directed against the electrode 10 of the cell 6 whereby a substantial temperature differential exists between the electrode 7 and the electrode 10. The electrodes 8 and 9 are connected by an electrical conductor 19.

The diaphragm plates 13 and 14 above mentioned preferably are constructed by suspending a plate of porous electrically conductive material which is not attacked by the electrolyte, such as graphite, clay coated with graphite or similar conductor between differentially charged electrodes immersed in an electrolyte such as zinc salt (zinc chloride) or salt of iron (iron chloride) and establishing a potential difference between the plate and a selected one of the electrodes whereby electro-deposition of the metal constituting the selected electrode takes place upon the plate concurrently with ion migration through the porous body of the plate. It will be evident that electro-deposition of material other than the electrode substance can be accomplished by appropriate selection of electrolyte. This is of importance because in many instances it is desirable to coat the plate with a metal of lower chemical activity than the electrode substance. Although in this manner an adherent though discontinuous and permeable deposit is obtained, it is not infrequently desirable to coat the diaphragm plate by physical, as distinguished from purely electrochemical, means in which instance a salt or compound of the selected metal, for example, copper, is coated upon the plate surface and, while there, reduced to the metal. This last mentioned method of providing a conductive surface on the plate is of importance particularly when the coating metal is mercury since the compounds of mercury are so easily reduced to the metal. While it is preferred that the metal on the plate surface be the same as the substance of the electrode with which the diaphragm is to be used, it need not invariably be so, as pointed out above. In other words plates 13 and 14 are diaphragm plates. There are two different salt solutions in the cell which may not be allowed to mix. The diaphragm plates are constructed from a graphite plate which is used as a base for metallic deposition. Graphite can not be used alone because it is porous to the extent that it would allow the solutions to mix gradually. It is only when a metallic coating is applied to the graphite plate that a satisfactory separator is obtained. It has been previously explained how the coating is applied and it will be seen that during the application the graphite plate may be included in the circuit. However, when plates 13 and 14 have been coated they serve only to keep the solutions separated and do not enter into the chemical actions of the cells. The remaining two plates in the cells are the electrodes entering into chemical action. Ionic conduction takes place through each separator plate, but the plate itself does not enter into chemical action and it is therefore not included in the electrical circuit in the operation of the cell.

Referring to Fig. 2 of the drawing it will be noted that this embodiment of the present invention comprises spaced electrically conductive plates 30 and 31, one cold and the other hot, which serve both as electrodes and as container walls wherein is received a suitable electrolyte 32. The electrodes are formed of the same matrial which as mentioned conducts electricity and which is not substantially affected by the electrolyte. Experience indicates that graphite is a material of this character.

One side of the electrode 30 is exposed and a flame 33 from a burner 34 plays thereagainst, the other side of the electrode being in contact with the electrolyte. One side of the other electrode 31 contacts the electrolyte 32 which its opposite side is cooled by water 35 circulated through the adjoining chamber 36 having an inlet 37 and an outlet 38.

Cork packing or similar electrically insulative material 39 and 40 closes the bottom of the cooling and electrolyte chambers respectively, the term "electrolyte chamber" being used to designate the space between the confronting electrode faces.

The electrolyte 32 comprises iron chloride, both ferrous chloride and ferric chloride. It is prepared substantially as follows: about two parts by weight of ferrous chloride are mixed with about one part by weight of ferric chloride crystals and the mixture is triturated. To the mixture is added about half its volume of relatively fine sawdust, which preferably has been chemically treated to remove impurities, together with sufficient distilled water to form a mass of pasty consistency. The stated proportions though presently preferred are not critical and slight variations therein do not seriously affect the characteristics of the cell.

While this embodiment of the present invention is in some respects more compact than the first described embodiment, it nevertheless is not preferable since experience indicates that it is difficult to make a substantial thermal differential between the electrodes due to thermo-conductivity of the electrolyte and the cell container.

A feature of the cell prepared as last above described is that its useful life for all practical purposes is substantially unlimited. It is presently thought that the mechanism of cell reaction may be explained as follows. The electrolyte is substantially an equilibrium mixture of solid ferrous and ferric chlorides in contact with solutions of the same, the sawdust serving to retain the solids substantially uniformly distributed within the cell. Of the two materials, the ferric chloride is the more soluble, the solubility of both salts increasing markedly with rise in temperature. In view of the increased solubility of the materials at higher temperatures, it will be apparent that the salt concentration in solution near the hot electrode 30 will be substantially greater than the concentration of the same substance near the relatively cool electrode 31. It is thought that the chemical reactions involved are substantially as follows:

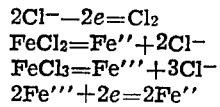

$2Cl^- - 2e = Cl_2$
$FeCl_2 = Fe'' + 2Cl^-$
$FeCl_3 = Fe''' + 3Cl^-$
$2Fe''' + 2e = 2Fe''$

Secondary reaction $2FeCl_2 + Cl_2 = 2FeCl_3$

The symbol $e$ indicates an electron in the foregoing formulae. These electrons combine, at the positive pole, with chlorine atoms to form chlorine ions since chlorine compounds are generally very soluble. They do not combine with oxygen atoms since oxygen containing compounds are practically insoluble. It is to be noted that neither electrode enters into chemical reaction with the electrolyte and that although reduction of ferric to ferrous iron takes place at the negative pole, oxidation of ferrous to ferric iron occurs at the positive pole thereby maintaining constant the composition of the electrolyte.

Diffusion of material within the electrolyte cell further assists in this respect.

A cell prepared as above last described provides an electrode potential of about $5 \times 10^{-7}$ volts per degree centigrade temperature difference between the electrodes. To assure maximum efficiency and useful life, the cell should be sealed to prevent action of the atmosphere on the electrolyte.

Having thus described the present invention, what it is desired to secure by Letters Patent is:

1. A cell useful in creating an electropotential difference which comprises a pair of similar units, each of said units comprising spaced confronting electrodes of the same metal and an electrolyte including a mixture of undissolved polar salt and dissolved salt of the electrode metal, said units being connected in series, and diaphragms within each of said units between the electrodes thereof and separating the cells into two compartments, said diaphragms each comprising a porous plate of electrically conducting material, means for heating one electrode of one cell, and means for cooling the opposed electrode of the other cell.

2. A cell useful in creating an electropotential difference which comprises a pair of similar units, each of said units comprising spaced confronting electrodes and an electrolyte including a mixture of undissolved polar salt and dissolved salt of the electrode metal, said units being connected in series, diaphragms within each of said units between the electrodes thereof and separating the cells into two compartments, said diaphragms each comprising a porous plate carrying an adherent superficial coating of substantially porous electrically conducting material, means for heating the electrode of one cell, and means for cooling the opposed electrode of the other cell.

RAYMOND H. DEYSHER.